United States Patent
Hirata et al.

(10) Patent No.: US 10,668,427 B2
(45) Date of Patent: Jun. 2, 2020

(54) ACID GAS RECOVERY METHOD AND SYSTEM AND IRON ION ANALYSIS METHOD AND SYSTEM

(71) Applicant: Mitsubishi Heavy Industries Engineering, Ltd., Kanagawa (JP)

(72) Inventors: Takuya Hirata, Tokyo (JP); Shinichi Okamoto, Tokyo (JP); Hiromitsu Nagayasu, Tokyo (JP); Masaru Chiyomaru, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 175 days.

(21) Appl. No.: 15/771,347

(22) PCT Filed: Oct. 20, 2016

(86) PCT No.: PCT/JP2016/081074
§ 371 (c)(1),
(2) Date: Apr. 27, 2018

(87) PCT Pub. No.: WO2017/073447
PCT Pub. Date: May 4, 2017

(65) Prior Publication Data
US 2018/0318760 A1 Nov. 8, 2018

(30) Foreign Application Priority Data

Oct. 27, 2015 (JP) ................................. 2015-210773

(51) Int. Cl.
*B01D 53/14* (2006.01)
*G01N 31/00* (2006.01)

(52) U.S. Cl.
CPC ..... *B01D 53/1475* (2013.01); *B01D 53/1412* (2013.01); *B01D 53/1425* (2013.01);
(Continued)

(58) Field of Classification Search
None
See application file for complete search history.

(56) References Cited

U.S. PATENT DOCUMENTS

2011/0056377 A1* 3/2011 Moniwa ............. B01D 53/1425
96/144
2015/0258497 A1 9/2015 Reddy et al.

FOREIGN PATENT DOCUMENTS

EP 0148604 A1 7/1985
JP H07-233489 A 9/1995
(Continued)

OTHER PUBLICATIONS

JP-2014185913-A English Translation (Year: 2014).*
(Continued)

*Primary Examiner* — Anita Nassiri-Motlagh
(74) *Attorney, Agent, or Firm* — Osha Liang LLP

(57) ABSTRACT

An acid gas recovery method includes removing acid gas from a target gas by bringing the target gas containing the acid gas into gas-liquid contact with an absorbent amine solution and causing the absorbent amine solution to absorb the acid gas; regenerating the absorbent amine solution by releasing the acid gas from the absorbent amine solution that has absorbed the acid gas; causing a chelate resin to adsorb iron ions from the absorbent amine solution by causing the absorbent amine solution to pass through the chelate resin; causing a regenerant solution to pass through a chelate resin having iron ions adsorbed thereon; regenerating the chelate resin and obtaining a regenerant solution containing the iron ions and quantitatively measuring the iron ions in the regenerant solution containing the iron ions and calculating a concentration of iron ions in the absorbent amine solution.

8 Claims, 3 Drawing Sheets

(52) U.S. Cl.
CPC ...... B01D 53/1462 (2013.01); *B01D 2257/60* (2013.01); *B01D 2258/0283* (2013.01); *G01N 31/00* (2013.01)

(56) References Cited

FOREIGN PATENT DOCUMENTS

| JP | 2009288021 A | * | 12/2009 |
| JP | 2014185913 A | * | 10/2014 |
| JP | 2015-108526 A | | 6/2015 |
| WO | 2014/086988 A1 | | 6/2014 |

OTHER PUBLICATIONS

JP-2009288021-A English Translation (Year: 2009).*
Supplementary European Search Report issued in corresponding European Patent Application No. EP 16859677.3, dated Jul. 24, 2019 (15 pages).
Zenovia Moldovan et al: "Spectrophotometric determination of trace iron(III) in natural water after its preconcentration with a chelating resin", Journal of the Serbian Chemical Society, vol. 67, No. 10, Jan. 1, 2002, pp. 669-676 (8 pages).
Schaffer S et al: "Direct determination of iron(II), iron(III) and total iron as UV-absorbing complexes by capillary electrophoresis", Journal of Chromatograhpy A, Elsevier, Amsterdam, NL, vol. 740, No. 1, Jul. 26, 1996, pp. 151-157 (7 pages).
E. A. Moawed et al: "Separation and determination of iron and manganese in water using polyhydroxyl polyurethane foam", Journal of the Association of Arab Universitys for Basic and Applied Sciences, vol. 14, No. 1, Oct. 1, 2013, pp. 60-66 (8 pages).
Scott Waite et al: "Chemical analysis in amine system operations", Dec. 31, 2013, XP055604237, Retrieved from the Internet: URL:http://www.eptq.com/articles/mpr_1507201314451.pdf [retrieved on Jul. 10, 2019] (11 pages).
Geoff Tyler et al: "AA or ICP—Which do you choose?", Oct. 30, 1991, XP055604407, Retrieved from the Internet: URL:http://image.sciencenet.cn/olddata/kexue.com.cn/bbs/upload/15147ICP_or AA.pdf [retrieved on Jul. 10, 2019] (6 pages).
Shaukat A. Mazari et al: "An overview of solvent management and emissions of amine-based CO2 capture technology", International Journal of Greenhouse Gas Control, vol. 34, Mar. 1, 2015, pp. 129-140 (12 pages).

* cited by examiner

ACID GAS RECOVERY METHOD AND SYSTEM AND IRON ION ANALYSIS METHOD AND SYSTEM

TECHNICAL FIELD

The present invention relates to an acid gas recovery method and system and an iron ion analysis method and system.

BACKGROUND

Various methods have been proposed for removing and recovering acid gases, such as $CO_2$ and $H_2S$, contained in exhaust gases from fossil fuel combustion. One such method brings combustion exhaust gas into contact with an absorbent amine solution such as an alkanolamine aqueous solution to remove and recover acid gas from the combustion exhaust gas.

Such absorbent amine solutions are known to cause corrosion of device materials due to degradation thereof. To address this, Patent Literature 1 describes a method of taking a measure that adds a corrosion inhibitor to an absorbent amine solution and maintains the corrosion inhibitor at a predetermined concentration in the following manner. The method measures the potential difference in the absorbent amine solution that changes with the concentration of the corrosion inhibitor and blows oxygen into the absorbent amine solution when the measured potential difference reaches a predetermined range.

Patent Literature 2 describes a water quality measuring device for obtaining pure water or ultrapure water. The device irradiates organic matter in the water with ultraviolet light to decompose and remove the organic matter and then measures ion concentrations of copper ions and iron ions in the water after the ultraviolet irradiation.

REFERENCE DOCUMENT LIST

Patent Documents

Patent Document 1: Japanese Unexamined Patent Application Publication No. 7-233489 A Patent Document 2: Japanese Unexamined Patent Application Publication No. 2015-108526 A In the process of removing and recovering acid gas, the absorbent amine solution repeatedly absorbs and releases the acid gas to be cyclically used, and the amine compound in the absorbent amine solution is oxidized and degraded. Production of such oxidized and degraded substances increases the corrosive effect of the absorbent amine solution on iron device materials, and iron ions dissolve into the absorbent amine solution. These iron ions exert a catalytic effect on the oxidation degradation reaction of the amine compound. Accordingly, an increase in the concentration of iron ions in the absorbent amine solution accelerates production of the oxidized and degraded substances that exert the corrosive effect on the device materials, significantly increasing the corrosion rate of the device materials. It is therefore necessary to monitor the concentration of iron ions in the absorbent amine solution and take a measure to reduce the concentration of iron ions in the absorbent amine solution when the concentration of iron ions increases.

The absorbent amine solution contains a high concentration of (20 to 70%) amine compound. To measure the concentration of iron ions, it is necessary to decompose and remove the entire amine compound in the absorbent amine solution. Pretreatments, such as a wet oxidative decomposition process according to the Japanese Industrial Standards, which is an operation to decompose and remove the amine compound, are complicated and require a long time. It is therefore difficult to frequently analyze and monitor the concentration of iron ions in the absorbent amine solution. If it takes a long time to obtain the measurement result of the concentration of iron ions after sampling the absorbent amine solution, as described above, corrosion of device materials is found too late since iron ions exert the catalytic effect on the oxidation degradation reaction of the amine compound. To take any measure, the process of removing and recovering acid gas needs to be suspended temporarily, so that the system fails to continue the stable operation.

SUMMARY OF THE INVENTION

One or more embodiments of the present invention provide an acid gas recovery system, an acid gas recovery method, an iron ion analysis system, and an iron ion analysis method which are capable of quantitatively measuring iron ions in the absorbent amine solution in a short time with high accuracy and quickly taking measures to remove factors increasing the corrosive effect of the absorbent amine solution.

An acid gas recovery method according to one or more embodiments includes the steps of: bringing target gas containing acid gas into gas-liquid contact with an absorbent amine solution to cause the absorbent amine solution to absorb the acid gas and remove the acid gas from the target gas; releasing the acid gas from the absorbent amine solution that has absorbed the acid gas to regenerate the absorbent amine solution; causing chelate resin to adsorb iron ions in the absorbent amine solution by causing the absorbent amine solution to pass through the chelate resin; causing a regenerant solution to pass through the chelate resin having iron ions adsorbed thereon, thereby desorbing the iron ions to regenerate the chelate resin and obtain the regenerant solution containing the iron ions; and quantitatively measuring the iron ions in the regenerant solution containing the iron ions and calculating the concentration of iron ions in the absorbent amine solution. The method may further include the step of removing the iron ions in the absorbent amine solution when the calculated concentration of iron ions in the absorbent amine solution is higher than a threshold value.

An acid gas recovery system according to one or more embodiments includes: an absorption tower that brings target gas containing acid gas into gas-liquid contact with an absorbent amine solution to cause the absorbent amine solution to absorb the acid gas and remove the acid gas from the target gas; a regeneration tower that releases the acid gas from the absorbent amine solution that has absorbed the acid gas in the acid gas absorption tower to regenerate the absorbent amine solution; a sample preparing device for iron ion quantitative measurement that causes chelate resin to absorb the iron ions in the absorbent amine solution to separate the iron ions from the absorbent amine solution and desorbs the iron ions from the chelate resin to provide a solution sample containing the desorbed iron ions; an iron ion quantitative measurement device that quantitatively measures the iron ions in the solution sample provided by the sample preparing device for iron ion quantitative measurement; and a controller that calculates the concentration of iron ions in the absorbent amine solution from the result of quantitative measurement for the iron ions by the iron ion quantitative measurement device. The system may further include a device that removes the iron ions in the absorbent amine solution when the calculated concentration of iron ions in the absorbent amine solution is higher than a threshold value.

An iron ion analysis method according to one or more embodiments includes the steps of: causing an absorbent amine solution to pass through chelate resin, thereby causing the chelate resin to adsorb iron ions in the absorbent amine solution; causing a regenerant solution to pass through the chelate resin with the iron ions adsorbed thereon to thereby desorb the iron ions to regenerate the chelate resin and provide the regenerant solution containing the iron ions; and quantitatively measuring the iron ions in the regenerant solution containing the iron ions and calculating the concentration of iron ions in the absorbent amine solution. The method may further include a step of removing the iron ions in the absorbent amine solution when the calculated concentration of iron ions in the absorbent amine solution is higher than a threshold.

An iron ion analysis system according to one or more embodiments includes: a sample preparing device for iron ion quantitative measurement that causes chelate resin to adsorb iron ions in an absorbent amine solution to separate the iron ions from the absorbent amine solution and desorbs the iron ions from the chelate resin to provide a solution sample containing the desorbed iron ions; an iron ion quantitative measurement device that quantitatively measures the iron ions in the solution sample provided by the sample preparing device for iron ion quantitative measurement; and a controller that calculates the concentration of iron ions in the absorbent amine solution from the result of quantitative measurement for the iron ions by the iron ion quantitative measurement device. The system may further include a device that removes iron ions in the absorbent amine solution when the calculated concentration of iron ions in the absorbent amine solution is higher than a threshold value.

According to one or more embodiments of the present invention, by causing the sample of the absorbent amine solution to pass through the chelate resin, the amine compound and iron ions in the absorbent amine solution are separated from each other. The iron ions adsorbed on the chelate resin are recovered with the regenerant solution as described above. Accordingly, the iron ions in the absorbent amine solution are quantitatively measured in short time with high accuracy. It is therefore possible to provide an acid gas recovery method and system and an iron ion analysis method and system enabling rapid measurement to eliminate factors increasing the corrosive effect of the absorbent amine solution.

DETAILED DESCRIPTION OF THE EMBODIMENTS

Hereinafter, a description is given of embodiments of an acid gas recovery method, an acid gas recovery system, an iron ion analysis method, and an iron ion analysis system according to the present invention in detail with reference to the accompanying drawings. The present invention is not limited by the embodiments described below.

Figure 1:
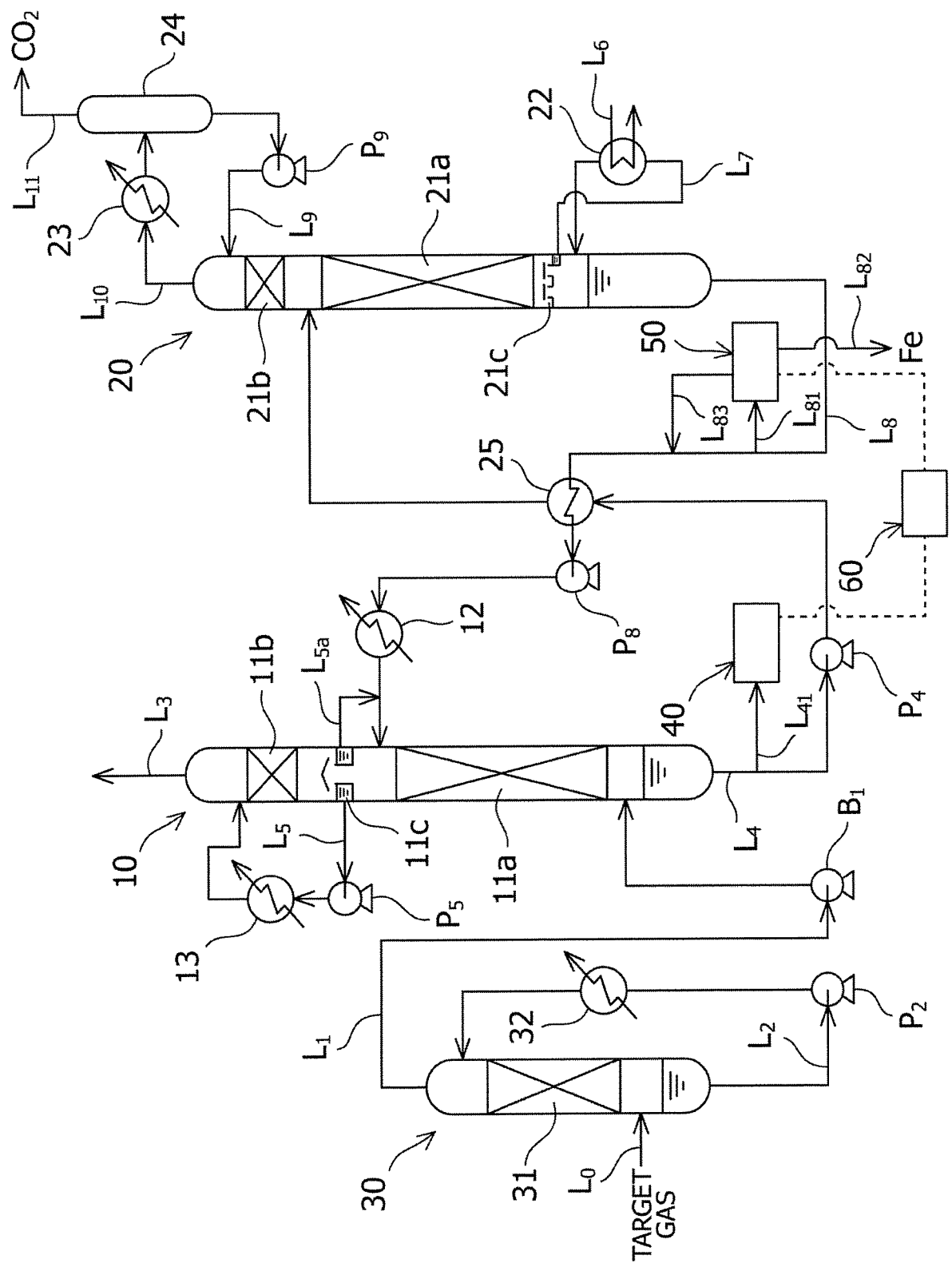
FIG. 1 is a schematic diagram illustrating an acid gas recovery system according to one or more embodiments of the present invention.
Figure 2:
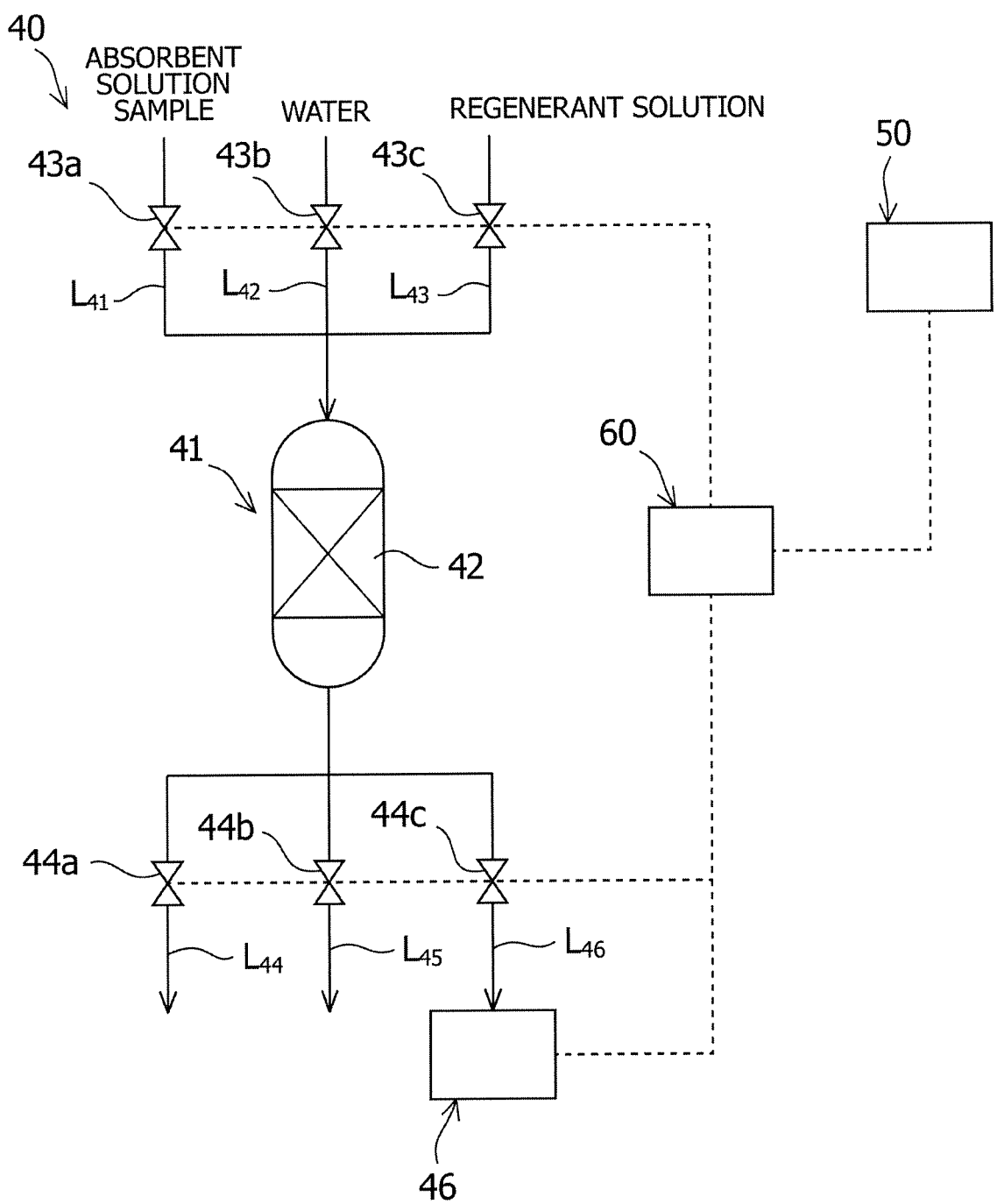
FIG. 2 is a schematic diagram illustrating an iron ion analyzer and the peripherals thereof in the acid gas recovery system illustrated in FIG. 1 in more detail.

As illustrated in FIGS. 1 and 2, the acid gas recovery system according to one or more embodiments includes at least an absorption tower 10, a regeneration tower 20, and an iron ion analyzer 40. The absorption tower 10 removes $CO_2$ from target gas containing $CO_2$ as acid gas by bringing the target gas into gas-liquid contact with an absorbent amine solution to cause the absorbent amine solution to absorb $CO_2$. The regeneration tower 20 releases $CO_2$ from the absorbent amine solution (rich solution) having absorbed $CO_2$ to regenerate the absorbent amine solution (lean solution) having released $CO_2$ as the $CO_2$ absorbent solution. The iron ion analyzer 40 quantitatively measures iron ions contained in the absorbent amine solution. In one or more embodiments, the acid gas is $CO_2$. The present invention is not limited to such a case and similarly functions in the case in which the acid gas is $H_2S$ or the case in which the acid gas includes both $CO_2$ and $H_2S$. FIGS. 1 and 2 are diagrams for explaining the summary of one or more embodiments of the invention, and do not illustrate some of the attached devices.

The absorption tower 10 is provided with: a line $L_1$ in the bottom thereof to supply the target gas containing $CO_2$ into the absorption tower 10; and a line $L_3$ in the top to discharge the target gas having the acid gas removed, from the absorption tower 10. The absorption tower 10 includes a lower packing section 11a and an upper packing section 11b between the position where the absorption tower 10 is connected to the line $L_1$ and the position where the absorption tower 10 is connected to the line $L_3$. In the lower packing section 11a, the target gas comes into gas-liquid contact with the absorbent amine solution. In the upper packing section 11b, the target gas having come into contact with the absorbent amine solution comes into gas-liquid contact with a cleaning solution. The absorption tower 10 further includes a water receiver 11c located between the upper and lower packing sections 11b and 11a. The water receiver 11c allows upward passage of gas but does not allow downward passage of liquid. The water receiver 11c is provided with a line $L_5$ that supplies liquid collected in the water receiver 11c into the absorption tower 10 from above the upper packing section 11b. This line $L_5$ is provided with a pump $P_5$ that feeds liquid and a cooler 13 that cools liquid.

In the bottom of the absorption tower 10, a line $L_4$ is provided. The line $L_4$ feeds a part of the absorbent amine solution (rich solution) having absorbed $CO_2$ to the regeneration tower 20. The line $L_4$ is provided with the iron ion analyzer 40, a pump $P_4$, and a heat exchanger 25, which are sequentially arranged from the absorption tower 10 side. The iron ion analyzer 40 measures the concentration of iron ions dissolved into the absorbent amine solution. The pump $P_4$ feeds the absorbent amine solution. The heat exchanger 25 exchanges heat between the rich solution and a later-described lean solution. These components are described in detail later.

The regeneration tower 20 includes a lower packing section 21a under the position of the line $L_4$ where the rich solution is supplied and an upper packing section 21b. The lower packing section 21a causes the rich solution to release $CO_2$. The upper packing section 21b washes the released $CO_2$ gas with reflux water described later. The regeneration tower 20 includes an absorbent solution receiver 21c under the lower packing section 21a. The absorbent solution receiver 21c is configured to allow upward passage of gas and not allow downward passage of liquid. The absorbent solution receiver 21c is provided with a line $L_7$ that supplies the rich solution collected in the absorbent solution receiver 21c into the regeneration tower 20 under the absorbent solution receiver 21c. The line $L_7$ is provided with a reboiler 22. The reboiler 22 heats the rich solution to release $CO_2$ from the rich solution. The reboiler 22 is provided with a line $L_6$ that supplies saturated steam for heating to the reboiler 22. In the top of the regeneration tower 20, a line $L_{10}$ is provided, that discharges $CO_2$ gas released from the rich solution, from the regeneration tower 20. The line $L_{10}$ is provided with a cooler 23 that cools the $CO_2$ gas and a gas-liquid separator 24 that separates condensed water generated by cooling from $CO_2$ gas. The gas-liquid separator 24 is provided with a line $L_9$ that supplies the separated condensed water to above the upper packing section 21b in the regeneration tower 20 as reflux water and a line $L_{11}$ that discharges the separated $CO_2$ out of the system.

In the bottom of the regeneration tower 20, a line $L_8$ is provided. The line $L_8$ supplies the lean solution which is heated and regenerated by the reboiler 22 to above the lower packing section 11a in the absorption tower 10. This line $L_8$ is provided with a reclaiming device 50, the heat exchanger 25, a pump $P_8$, a cooler 12, and a line $L_{5a}$, which are sequentially arranged from the regeneration tower 20 side. The reclaiming device 50 is activated when the concentration of iron ions in the absorbent amine solution exceeds a threshold and removes iron ions in the absorbent amine solution. The heat exchanger 25 exchanges heat between the lean solution and the rich solution flowing through the line $L_4$. The pump $P_8$ feeds the lean solution. The cooler 12 cools the lean solution. The line $L_{5a}$ supplies a part of the liquid collected in the water receiver 11c of the absorption tower 10 into the absorption tower 10 together with the lean solution. These components are described in more detail later.

In the upstream side of the absorption tower 10 in the flow direction of the target gas, a cooling tower 30 is provided. The cooling tower 30 cools the target gas before the target gas is supplied to the absorption tower 10. The cooling tower 30 is provided with a line $L_0$ in the bottom and the line $L_1$ in the top. The line $L_0$ supplies the target gas into the cooling tower 30. The line $L_1$ discharges the cooled target gas from the cooling tower 30 and supplies the same to the absorption tower 10. The cooling tower 30 includes a packing section 31 between the position where the cooling tower 30 is connected to the line $L_0$ and the position where the cooling tower 30 is connected to the line $L_1$. The packing section 31 is configured to bring cooling water and the target gas into contact to each other. The line $L_1$, which supplies the target gas, is provided with a blower $B_1$ for feeding the target gas. In the bottom of the cooling tower 30, a line $L_2$ is provided, that supplies cooling water collected in the bottom to above the packing section 31 in the cooling tower 30. The line $L_2$ is provided with a cooler 32 to cool the cooling water.

The reclaiming device 50 is communicable with a controller 60, which is described in detail later. The operation of the reclaiming device 50 is controlled by the controller 60. The reclaiming device 50 is provided with lines $L_{81}$, $L_{82}$, and $L_{83}$. The line $L_{81}$ supplies the absorbent amine solution from the line $L_8$ for the lean solution to the reclaiming device 50. The line $L_{82}$ discharges residues containing the iron ions removed from the absorbent amine solution. The line $L_{83}$ supplies the absorbent amine solution with the corrosive effect reduced by removal of iron ions, to the absorption tower 10 to be reused.

The reclaiming device 50 uses a thermal reclaiming process and includes at least a vaporizer and a cooler (not illustrated). The reclaiming device 50 heats the absorbent amine solution by the vaporizer to a temperature at which the amine compound in the absorbent amine solution vaporizes to separate the iron ions and amine compound in the absorbent amine solution from each other. The reclaiming device 50 then liquefies the vaporized amine compound by the cooler to provide the absorbent amine solution. The reclaiming device 50 is not limited to the above configuration as long as the reclaiming device 50 is able to separate iron ions from the absorbent amine solution. The reclaiming device 50 may also be a device using a publicly-known electrodialysis or ion exchange process, for example. The reclaiming device using the thermal reclaiming process is not limited to the above configuration. The reclaiming device 50 may be configured without the cooler, for example. In this case, the absorbent amine solution is supplied to the reclaiming device 50 from the outlet side of the pump $P_8$ in the line $L_8$, and the absorbent solution with the corrosive effect reduced is supplied into the regeneration tower 20 under the absorbent solution receiver 21c.

A description is given of the iron ion analyzer 40 in more detail using FIG. 2. As illustrated in FIG. 2, the iron ion analyzer 40 includes at least a quantitative measurement sample preparing device 41 and an absorptiometer 46. The quantitative measurement sample preparing device 41 removes the amine compound from a sample of the absorbent amine solution to prepare a sample for quantitative measurement of iron ions. The absorptiometer 46 uses the sample for quantitative measurement to perform quantitative measurement of iron ions.

The quantitative measurement sample preparing device 41 includes chelate resin 42 inside, to which iron ions in the sample of the absorbent amine solution adhere. The chelate resin 42 is not particularly limited and can be iminodiacetic acid [—N($CH_2$COO—)$_2$] chelate resin or polyamine [—NH($CH_2CH_2$NH)$_n$·H] chelate resin, for example because these chelate resins are highly iron ion-selective. The quantitative measurement sample preparing device 41 is provided with three lines $L_{41}$, $L_{42}$, and $L_{43}$ in order to cause the sample of the absorbent amine solution, water, and regenerant solution to separately pass through the chelate resin 42. The lines $L_{41}$, $L_{42}$, and $L_{43}$ supply the sample of the absorbent amine solution, water, and regenerant solution into the quantitative measurement sample preparing device 41, respectively. The lines $L_{41}$, $L_{42}$, and $L_{43}$ are respectively provided with on-off valves 43a, 43b, and 43c, which are capable of controlling the flow rate. The quantitative measurement sample preparing device 41 is further provided with three lines $L_{44}$, $L_{45}$, and $L_{46}$, that discharge the sample of the absorbent amine solution, water, and regenerant solution having passed through the chelate resin 42, respectively. The lines $L_{44}$, $L_{45}$, and $L_{46}$ are respectively provided with on-off valves 44a, 44b, and 44c, which are capable of controlling the flow rate. The line $L_{46}$, which discharges the regenerant solution having passed through the chelate resin 42, is connected to the absorptiometer 46 so as to supply the regenerant solution as a sample for quantitative measurement of iron ions.

In the quantitative measurement sample preparing device 41, the line $L_{41}$, which supplies the sample of the absorbent amine solution, may be provided with a pH meter and a device to add a pH adjuster to adjust the pH of the sample of the absorbent amine solution or may be provided with a filter to remove solids in the absorbent amine solution. The line $L_{41}$ may be provided with a diluter that adds pure water to the sample of the absorbent amine solution in order to dilute the absorbent amine solution.

The absorptiometer 46 is a device which causes light to penetrate the sample for quantitative measurement prepared as described above to measure the absorbance at a predetermined wavelength corresponding to iron ions. The absorptiometer 46 includes a device to add a predetermined color reagent to the sample for quantitative measurement if necessary (not illustrated). The absorptiometer 46 is configured to communicate with the controller 60 so that the measurement result is transmitted to the controller 60. One or more embodiments include the absorptiometer 46 as the device to quantitatively measure iron ions. However, the present invention is not limited to the absorptiometer 46. The device to quantitatively measure iron ions may be a spectrometer such as an atomic absorption spectrometer, an inductively coupled plasma (ICP) optical emission spectrometer, or an X-ray fluorescence spectrometer, for example.

The controller 60 is configured to communicate with all of the aforementioned on-off valves 43a to 43c and 44a to 44c and controls on and off of these valves and the flow rates of the sample of the absorbent amine solution, water, and regenerant solution passing through the valves. The controller 60 includes a function to calculate the concentration of iron ions in the sample of the absorbent amine solution from the flow rate of the sample of the absorbent amine solution having passed through the quantitative measurement sample preparing device 41, the flow rate of the regenerant solution discharged from the quantitative measurement sample preparing device 41, and the value of the absorbance measured by the absorptiometer 46, using the calibration curve of the concentration of iron ions. The controller 60 includes a function to transmit a signal to activate the reclaiming device 50 in order to remove iron ions in the absorbent amine solution when the calculated concentration of iron ions is not less than a threshold value while transmitting a signal to stop the reclaiming device 50 when the calculated concentration of iron ions is less than a threshold value.

In FIG. 1, the iron ion analyzer 40 is located on the absorption tower 10 side in the line $L_4$, which supplies the rich solution from the absorption tower 10 to the regeneration tower 20. However, the present invention is not limited to this configuration, and the iron ion analyzer 40 may be located on the regeneration tower 20 side in the line $L_4$. Alternatively, the iron ion analyzer 40 may be located either on the regeneration tower 20 side or absorption tower 10 side in the line $L_8$, which supplies the lean solution from the regeneration tower 20 to the absorption tower 10. The iron ion analyzer 40 may be located within either the absorption tower 10 or regeneration tower 20. Preferably, the iron ion analyzer 40 is located on the line $L_8$ for the lean solution in which the concentration of iron ions in the absorbent amine solution is measured comparatively easily.

In FIG. 1, the reclaiming device 50 is located on the regeneration tower 20 side in the line $L_8$, which supplies the lean solution from the regeneration tower 20 to the absorption tower 10. The present invention is not limited to the above configuration. The reclaiming device 50 may be located on the absorption tower 10 side in the line $L_8$ or may be located on the absorption tower 10 side or regeneration tower 20 side in the line $L_4$, which supplies the rich solution from the absorption tower 10 to the regeneration tower 20. Preferably, the reclaiming device 50 is located in the line $L_8$ for the lean solution in which iron ions can be removed from the absorbent amine solution comparatively easily.

An acid gas recovery method and iron ion analysis method according to one or more embodiments of the present invention are described below with reference to the system having the aforementioned configuration.

First, the target gas containing $CO_2$ is supplied from the line $L_0$ to the cooling tower 30 to be cooled. The target gas is gas containing acid gas such as $CO_2$ and $H_2S$, including natural gas, process gas produced at a chemical plant for ammonia production or the like, synthetic gas such as coal gasification gas, and exhaust gas from fossil fuel combustion, for example. In the cooling tower 30, the target gas is cooled to a predetermined temperature with cooling water from the cooler 32 in the packing section 31 and is then introduced to lower part of the absorption tower 10 via the line $L_1$ by the blower $B_1$. The target gas is preferably cooled to 30 to 40° C., for example, from the viewpoint of the absorption efficiency in the absorption tower 10. The cooling water collected in the bottom of the cooling tower 30 is cooled by the cooler 32 via the line $L_2$ with the pump $P_2$ and is then supplied to the cooling tower 30 for cyclic use.

Subsequently, the target gas introduced from the line $L_1$ is brought into countercurrent contact with the absorbent amine solution introduced from the line $L_8$ in the lower packing section 11a and allows the absorbent amine solution to absorb $CO_2$ in the target gas by for removal of $CO_2$ from the target gas. This process can remove 90% or more of $CO_2$ from the target gas. The absorbent amine solution is an aqueous solution of the amine compound. Examples of the amine compound are alkanolamines such as monoethanolamine, diethanolamine, diisopropanolamine, methyldiethanolamine, and triethanolamine.

The target gas having $CO_2$ removed is accompanied by the amine compound and water vaporized under high temperature due to exothermic reaction of $CO_2$ absorption. The target gas is accordingly brought into contact with the cleaning solution in the upper packing section 11b, where the water and amine compound in the gas are condensed and recovered into the cleaning solution. The target gas having $CO_2$ removed is discharged from the top of the absorption tower 10 via the line $L_3$. The cleaning solution containing the water and amine compound is collected in the water receiver 11c. A part of the collected cleaning solution is cooled by the cooler 13 via the line $L_5$ with the pump $P_5$ and is then supplied to above the upper packing section 11b of the absorption tower 10 for cyclic use as the cleaning solution. Another part of the collected cleaning solution as a surplus is added to the line $L_8$, which supplies the lean solution, via the line $L_{5a}$ as the absorbent amine solution. The rich solution having absorbed $CO_2$ is collected in the bottom of the absorption tower 10. A part of the collected rich solution is heated by the heat exchanger 25 via the line $L_4$ with the pump $P_4$ and is supplied to the regeneration tower 20. The absorbent amine solution of the line $L_4$ is sampled at predetermined intervals as a sample used to measure the concentration of iron ions via the line $L_{41}$ and is then fed to the iron ion analyzer 40. The measurement operation in the iron ion analyzer 40 is described later.

The rich solution supplied to the regeneration tower 20 releases $CO_2$ due to endothermic reaction in the lower packing section 21a as flowing down to be collected in the absorbent solution receiver 21c. The collected rich solution is supplied to the reboiler 22 via the line $L_7$ and is subjected to heat exchange with hot saturated steam from the line $L_6$ to be heated and release $CO_2$ contained in the rich solution. The saturated steam introduced to the reboiler 22 is condensed due to the heat exchange with the absorber into saturated water, which is then discharged from the reboiler 22. The lean solution having released $CO_2$ is collected in the bottom of the regeneration tower 20.

The $CO_2$ gas separated from the absorbent solution is brought into gas-liquid contact with reflux water supplied from the line $L_9$ in the upper packing section 21b of the regeneration tower 20 for removal of the accompanied absorbent amine solution. The resultant gas is discharged from the top of the regeneration tower 20 via the line $L_{10}$. The $CO_2$ gas is cooled by the cooler 23, condensing the accompanied water vapor. The resultant is separated into $CO_2$ gas and condensed water in the gas-liquid separator 24. The separated $CO_2$ gas is discharged via the line $L_{11}$ to be recovered as pure $CO_2$ gas. The condensed water is supplied to the regeneration tower 20 via the line $L_9$ with the pump $P_9$ to be reused as the reflux water.

The lean solution collected in the bottom of the regeneration tower 20 is introduced into the heat exchanger 25 via the line $L_8$ with the pump $P_8$ and is then subjected to heat exchange with the rich solution to be cooled. The resultant lean solution is further cooled with the cooler 12 and is supplied to the absorption tower 10 for cyclic use as the absorbent amine solution for absorbing $CO_2$. The temperature of the absorbent amine solution to be supplied to the absorption tower 10 is adjusted by the heat exchanger 25 and cooler 12.

In such a manner, the absorbent amine solution absorbs $CO_2$ in the absorption tower 10, releases $CO_2$ in the regeneration tower 20, and then absorbs $CO_2$ in the absorption tower 10 again for cyclic use. The amine compound in the absorbent amine solution is thereby oxidized and degraded. Production of such oxidized and degraded substances increases the corrosive effect of the absorbent amine solution on iron device materials, and iron ions dissolve into the absorbent amine solution. These iron ions exert a catalytic effect on the oxidation degradation reaction of the amine compound. Accordingly, an increase in the concentration of iron ions in the absorbent amine solution accelerates production of the oxidized and degraded substances that exert the corrosive effect on the device materials and significantly increases the corrosion rate of the device materials. Accordingly, the concentration of iron ions in the absorbent amine solution is measured at predetermined intervals, for example, with a frequency of twice per day by sampling a part of the cyclically used absorbent amine solution and feeding the sample to the iron ion analyzer 40. This process is described in more detail with reference to FIG. 2.

As illustrated in FIG. 2, first, the controller 60 opens only the two on-off valves 43a and 44a for samples of the absorbent amine solution to introduce a sample of the absorbent amine solution into the quantitative measurement sample preparing device 41 from the line $L_{41}$ at a predetermined flow rate, causing the sample of the absorbent amine solution to pass through the chelate resin 42. On the chelate resin 42 through which the sample of the absorbent amine solution has passed, iron ions in the sample of the absorbent amine solution are selectively adsorbed. This can separate iron ions from the amine compound. The fed sample of the absorbent amine solution has iron ions removed and the amine compound remaining and is discharged from the line $L_{44}$. The pH value of the sample of the absorbent amine solution may be adjusted in advance by adding hydrochloric acid, nitric acid, sulfuric acid, or the like as the pH adjuster before the sample of the absorbent amine solution is introduced into the chelate resin 42. The pH value preferably ranges from 1 to 10 and more preferably ranges from 8 to 10, for example.

Before the sample of the absorbent amine solution is supplied into the quantitative measurement sample preparing device 41, solids in the absorber may be removed with the aforementioned filter (not illustrated). This can prevent the chelate resin 42 from clogging with solids. The sample of the absorbent amine solution may be diluted by adding pure water to the absorber sample in the aforementioned diluter (not illustrated) before the sample of the absorbent amine solution is supplied into the quantitative measurement sample preparing device 41. This can reduce the viscosity of the absorber sample to increase the flow rate of the sample of the absorbent amine solution in the chelate resin 42.

Next, the controller 60 opens only the two on-off valves 43b and 44b for water to introduce pure water into the quantitative measurement sample preparing device 41 from the line $L_{42}$, causing the pure water to pass through the chelate resin 42. By causing the pure water to pass through the chelate resin 42, the amine compound partially adhering to the chelate resin 42 is washed away. The pure water which contains the amine compound and has passed through the chelate resin 42 is discharged from the line $L_{45}$. Removing the amine compound just adhering to the chelate resin 42 improves the accuracy of the concentration analysis for iron ions.

The controller 60 then opens only the two on-off valves 43c and 44c for regenerant solution to introduce the regenerant solution into the quantitative measurement sample preparing device 41 from the line $L_{43}$ at a predetermined flow rate, causing the regenerant solution to pass through the chelate resin 42. By causing the regenerant solution to pass through the chelate resin 42, the iron ions adsorbed on the chelate resin 42 are desorbed, so that the chelate resin 42 is regenerated. The regenerant solution having passed through the chelate resin 42 therefore contains all iron ions adsorbed to the chelate resin 42 from the sample of the absorbent amine solution, thus preparing a sample for quantitative measurement. The sample for quantitative measurement is introduced into the absorptiometer 46 from the line $L_{46}$. The regenerant solution needs to be capable of desorbing iron ions adsorbed on the chelate resin 42 and include no compound that has disadvantage on measurement of the concentration of iron ions. The regenerant solution can be an acid aqueous solution, for example. The acid thereof, in particular, is preferably hydrochloric acid, sulfuring acid, nitric acid, or the like, and the pH value ranges from 1 to 6 and more preferably ranges from 1 to 3.

The absorptiometer 46 into which the sample for quantitative measurement measures the absorbance of iron compounds in the sample for quantitative measurement by absorption photometry. A predetermined color reagent is added to the sample for quantitative measurement. Additionally, it is necessary to previously create a calibration curve that shows the correlation between the concentration of iron ions and absorbance by using iron standard solution. The measured absorbance is transmitted to the controller 60. This example shows the absorption photometry. The present invention is not limited thereto. The quantitative measurement of iron ions may use atomic absorption photometry, ICP optical emission spectrometry, X-ray fluorescence spectrometry, or the like as described above.

The controller 60 calculates the concentration of iron ions in the absorbent amine solution using the calibration curve based on the actual value of the absorbance measured by the absorptiometer 46 and the flow rates of the sample of the absorbent amine solution passing through the quantitative measurement sample preparing device 41 and the regenerant solution discharged from the quantitative measurement sample preparing device 41. When the calculated concentration of iron ions in the absorbent amine solution is not less than a predetermined threshold, the controller 60 instructs the reclaiming device 50 to activate in order to remove iron ions in the absorbent amine solution. In such manner, the concentration of iron ions in the absorbent amine solution is measured in a short time after the absorbent amine solution is sampled. This allows the treatment to remove iron ions, which exert the catalytic effect on the oxidation degradation reaction, to be performed quickly before production of the oxidized degraded substances in the absorbent amine solution increases at an accelerated rate. The threshold for the concentration of iron ions is preferably as low as possible. The threshold may be set in a range from 1 to 10 ppm or may be set to a quantitative measurement limit of the iron ion quantitative measurement device such as an absorptiometer 46, for example.

When the reclaiming device 50 is activated by the controller 60, as illustrated in FIG. 1, a part of the absorbent amine solution is introduced into the reclaiming device 50 from the line $L_{81}$ and is heated by an evaporator (not illustrated) to a temperature at which the amine compound is vaporized. The vaporized amine compound is condensed with a cooler (not illustrated) to be regenerated as the absorbent amine solution, which is then returned from the line $L_{83}$ to the line $L_8$ for the lean solution to be reused. The iron ions, oxidized degraded substances of the amine compound, and the like which remain without being evaporated are discharged from the line $L_{82}$ as sludge. The controller 60 instructs the reclaiming device 50 to stop when the measured concentration of iron ions in the iron ion analyzer 40 is less than the predetermined threshold. Since the time taken for the iron ion analyzer 40 to measure the concentration of iron ions is shorter than the conventional one, the frequency of measurement for iron ions may be increased.

In such a manner, the concentration of iron ions is maintained at a low concentration by removing iron ions from the absorbent amine solution. The system is able to continue to operate stably for a long period of time. In one or more embodiments, the method of removing iron uses the thermal reclaiming process. However, the present invention is not limited to this and can employ an electrodialysis or an ion exchange process.

EXAMPLE

Hereinafter, a description is given of an example of the present invention.
1. Preparation of Quantitative Measurement Sample As an example, samples for quantitative measurement containing iron ions were prepared as follows. Iron ions were added to five absorbent amine solutions of the same concentration to produce five types of absorbent amine solutions including different concentrations of iron ions. The five types of absorbent amine solutions were caused to pass through chelate resin. After the chelate resin was washed with pure water, nitric acid aqueous solution having a pH of 1 was caused to pass through the chelate resin.

As a comparative example, samples for quantitative measurement were prepared as follows. The five absorbent amine solutions which are the same as those of Example and include the different concentrations of iron ions were used. In order to decompose the amine compound in the absorbent amine solutions, the wet oxidative decomposition process standardized by JIS J0102 (2013), nitric acid was added to the five absorbent amine solutions. The resultant products were repeatedly treated with operations of heating, boiling, and cooling until all of the amine compound was decomposed.
2. Quantitative Measurement of Iron Ions The samples for quantitative measurement of Example were measured in terms of absorbance using an absorption spectrometer (UVmini 1240 made by SHIMAZU CORPORATION). From the measured values and volumes of the absorbent amine solution and regenerant solution, the concentration (mg/kg) of iron ions in the absorbent amine solution was calculated using a calibration curve produced using the iron standard solution.

Figure 3:
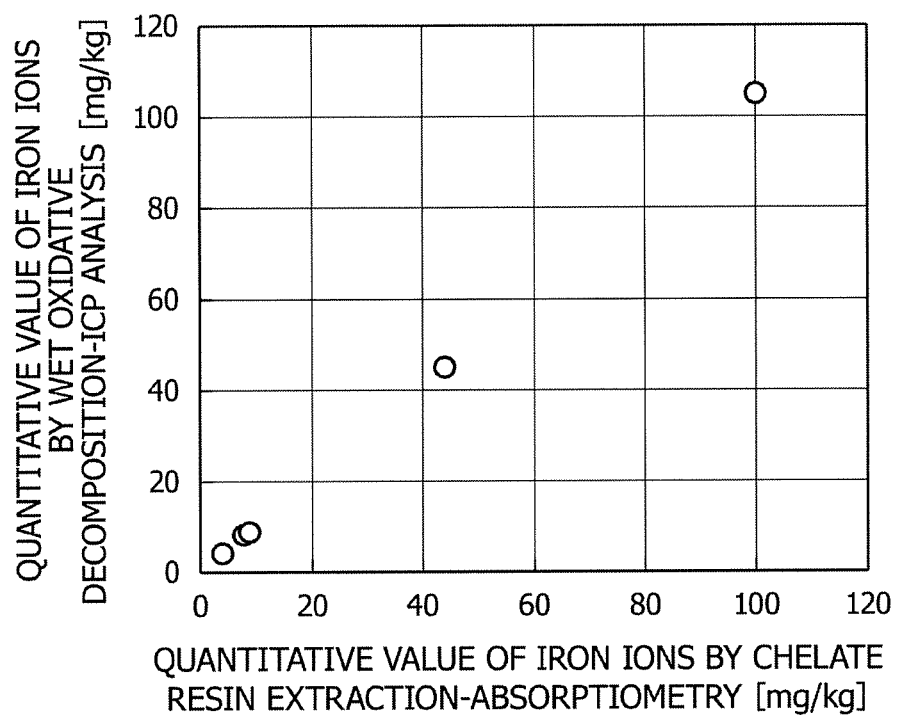
FIG. 3 is a graph illustrating the relationship between iron ion quantitative values of Examples by an iron ion analysis method according to one or more embodiments of the present invention and those by a conventional method according to JIS.

As for samples for the quantitative measurement of the comparative example, the concentration (mg/kg) of iron ions in the absorbent amine solution was measured by an TOP optical emission spectroscopy (ICPS-7510 made by SHIMAZU CORPORATION) according to the method standardized in JIS K0102(2013). These results are illustrated in FIG. 3. FIG. 3 shows a comparison in accuracy between the concentration of iron ions of the Example (on the horizontal axis) and the concentration of iron ions of the Comparative Example (on the vertical axis).

As illustrated in FIG. 3, the concentrations of iron ions quantitatively determined by the iron ion analysis method according to one or more embodiments of the present invention were substantially the same as the accurate concentrations of iron ions of Comparative Examples quantitatively determined according to JIS. It is therefore revealed that according to the iron ion analysis method of one or more embodiments of the present invention, the pretreatment using chelate resin can be performed in a short time and yields accurate results for the concentration of iron ions.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SYMBOL LIST

Absorption Tower
11a, 21a Lower packing section
11b, 21b Upper packing section
11c Water receiver
12, 13, 23, 32 Cooler
20 Regeneration tower
21c Absorbent solution receiver
22 Reboiler
24 Gas-liquid separator
25 Heat exchanger
30 Cooling tower
31 Packing section
40 Iron ion analyzer
41 Quantitative measurement sample preparing device
42 Chelate resin
46 Absorption spectrometer
50 Reclaiming device
60 Controller

The invention claimed is:
1. An acid gas recovery method, comprising:
removing acid gas from a target gas by bringing the target gas containing the acid gas into gas-liquid contact with an absorbent amine solution and causing the absorbent amine solution to absorb the acid gas;
regenerating the absorbent amine solution by releasing the acid gas from the absorbent amine solution that has absorbed the acid gas;
causing a chelate resin to adsorb iron ions including iron ions dissolved from an iron device material, from the absorbent amine solution after contact with the target gas or after regeneration by causing the absorbent amine solution to pass through the chelate resin;

causing a regenerant solution to pass through the chelate resin having iron ions adsorbed thereon;

regenerating the chelate resin and obtaining a regenerant solution containing the iron ions; and quantitatively measuring the iron ions in the regenerant solution containing the iron ions and calculating a concentration of iron ions in the absorbent amine solution.

2. The acid gas recovery method according to claim 1, further comprising removing the iron ions from the absorbent amine solution after regeneration when the calculated concentration of iron ions in the absorbent amine solution is higher than a threshold value.

3. An acid gas recovery system, comprising:

an absorption tower that removes acid gas from a target gas by bringing the target gas containing the acid gas into gas-liquid contact with an absorbent amine solution and causing the absorbent amine solution to absorb the acid gas;

a regeneration tower that regenerates the absorbent amine solution by releasing the acid gas from the absorbent amine solution that has absorbed the acid gas in the acid gas absorption tower;

a sample preparing device for iron ion quantitative measurement that causes a chelate resin to adsorb the iron ions from the absorbent amine solution, separates the iron ions from the absorbent amine solution, desorbs the iron ions from the chelate resin, and provides a solution sample containing the desorbed iron ions;

an iron ion quantitative measurement device that is connected to the sample preparing device for iron ion quantitative measurement via a line capable of passing through the solution sample, and that quantitatively measures the iron ions in the solution sample provided by the sample preparing device; and a controller that is communicably connected to on-off valves on an inlet and an outlet of the sample preparing device for iron ion quantitative measurement such that on and off of the on-off valves are controlled, that is communicably connected to the iron ion quantitative measurement device, and that calculates a concentration of iron ions in the absorbent amine solution from a result of quantitative measurement for the iron ions by the iron ion quantitative measurement device, wherein the sample preparing device for iron ion quantitative measurement and the iron ion quantitative measurement device are located on a line for supplying the absorbent amine solution that has absorbed the acid gas from the absorption tower to the regeneration tower, or are located on a line for supplying the regenerated absorbent amine solution from the regeneration tower to the absorption tower.

4. The acid gas recovery system according to claim 3, further comprising a device that is located on the line for supplying the regenerated absorbent amine solution from the regeneration tower to the absorption tower, that is communicably connected to the controller such that an operation thereof is controlled by the controller, and that removes the iron ions from the absorbent amine solution after regeneration when the calculated concentration of iron ions in the absorbent amine solution is higher than a threshold value.

5. An iron ion analysis method in an absorbent amine solution, comprising:

causing a chelate resin to adsorb iron ions from an absorbent amine solution by causing the absorbent amine solution to pass through the chelate resin;

desorbing the iron ions to regenerate the chelate resin by causing a regenerant solution to pass through the chelate resin with the iron ions adsorbed thereon, and obtaining the regenerant solution containing the desorbed iron ions; and quantitatively measuring the iron ions in the regenerant solution containing the iron ions and calculating a concentration of iron ions in the absorbent amine solution.

6. The iron ion analysis method according to claim 5, further comprising removing the iron ions from the absorbent amine solution when the calculated concentration of iron ions in the absorbent amine solution is higher than a threshold.

7. An iron ion analysis system in an absorbent amine solution, comprising:

a sample preparing device for iron ion quantitative measurement that causes chelate resin to adsorb the iron ions from the absorbent amine solution, separates the iron ions from the absorbent amine solution, desorbs the adsorbed iron ions from the chelate, and provides a solution sample containing the desorbed iron ions;

an iron ion quantitative measurement device that is connected to the sample preparing device for iron ion quantitative measurement via a line capable of passing through the solution sample, and that quantitatively measures the iron ions in the solution sample provided by the sample preparing device; and a controller that is communicably connected to on-off valves on an inlet and an outlet of the sample preparing device for iron ion quantitative measurement such that on and off of the on-off valves are controlled, that is communicably connected to the iron ion quantitative measurement device, and that calculates a concentration of iron ions in the absorbent amine solution from a result of quantitative measurement for the iron ions by the iron ion quantitative measurement device.

8. The iron ion analysis system according to claim 7, further comprising a device that is communicably connected to the controller such that an operation thereof is controlled by the controller, and that removes the iron ions from the absorbent amine solution before iron ion removal when the calculated concentration of iron ions in the absorbent amine solution is higher than a threshold value.

* * * * *